United States Patent [19]
Dietrich, Sr.

[11] Patent Number: 5,540,288
[45] Date of Patent: Jul. 30, 1996

[54] PRIMARY TILLAGE UNIT WITH REDUCED DISTURBANCE OF SURFACE SOIL AND RESIDUE

[75] Inventor: William J. Dietrich, Sr., Congerville, Ill.

[73] Assignee: DMI, Inc., Goodfield, Ill.

[21] Appl. No.: 452,850

[22] Filed: May 30, 1995

[51] Int. Cl.⁶ .................................................. A01B 13/08
[52] U.S. Cl. ........................... 172/196; 172/166; 172/730
[58] Field of Search ..................................... 172/195, 166, 172/165, 196, 181, 699, 700, 724, 725, 730; 52/660; 111/123, 156, 187

[56] References Cited

U.S. PATENT DOCUMENTS

| | | |
|---|---|---|
| 3,880,242 | 4/1975 | Rogers . |
| 3,931,858 | 1/1976 | North .................................. 172/196 X |
| 4,457,381 | 7/1984 | Wetmore . |
| 4,461,355 | 7/1984 | Peterson . |
| 4,560,011 | 12/1985 | Peterson . |
| 4,645,013 | 2/1987 | Edmisson . |
| 4,834,189 | 5/1989 | Peterson . |
| 4,909,335 | 3/1990 | Wah, Jr. .............................. 172/196 X |
| 5,172,770 | 12/1992 | Moyle ................................. 172/730 X |
| 5,176,209 | 1/1993 | VandenBrink ....................... 172/730 X |
| 5,259,461 | 11/1993 | Cochrane ................................. 172/730 |
| 5,333,694 | 8/1994 | Roggenbuck et al. ............... 172/196 X |
| 5,437,337 | 8/1995 | Dietrich, Sr. ........................ 172/730 X |

*Primary Examiner*—Terry Lee Melius
*Assistant Examiner*—Robert Pezzuto
*Attorney, Agent, or Firm*—Emrich & Dithmar

[57] ABSTRACT

A conservation tillage unit for use in primary tillage includes a rolling coulter followed by a chisel plow having a narrow shank and a soil working unit mounted to the bottom of the shank. The working unit includes a point and a delta wing mounted behind and above the point, and forward of the shank. The working unit fractures the soil beneath the surface without throwing the surface soil and residue to the side and while leaving only a narrow furrow behind the shank even at ground speeds up to five to seven miles per hour.

12 Claims, 14 Drawing Sheets

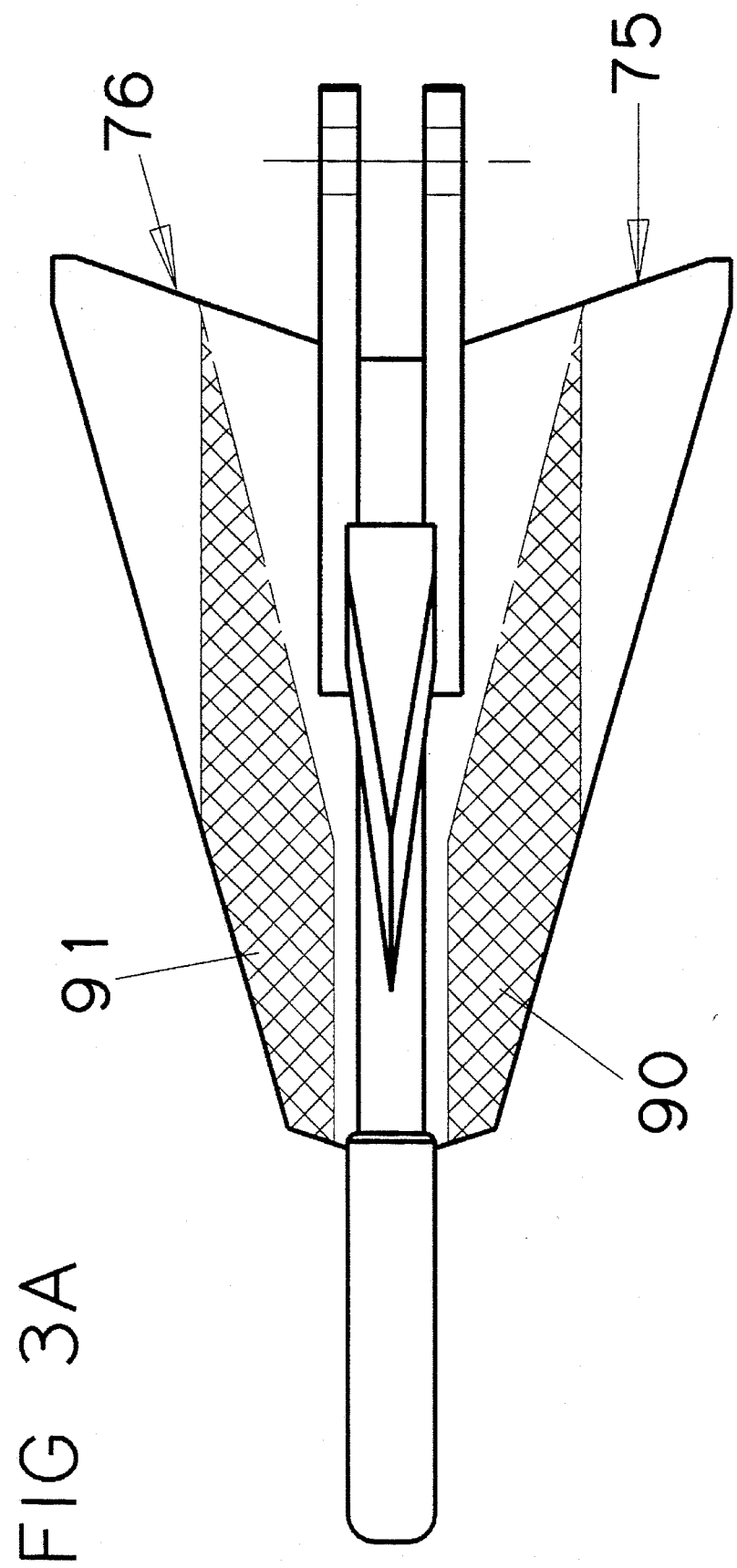

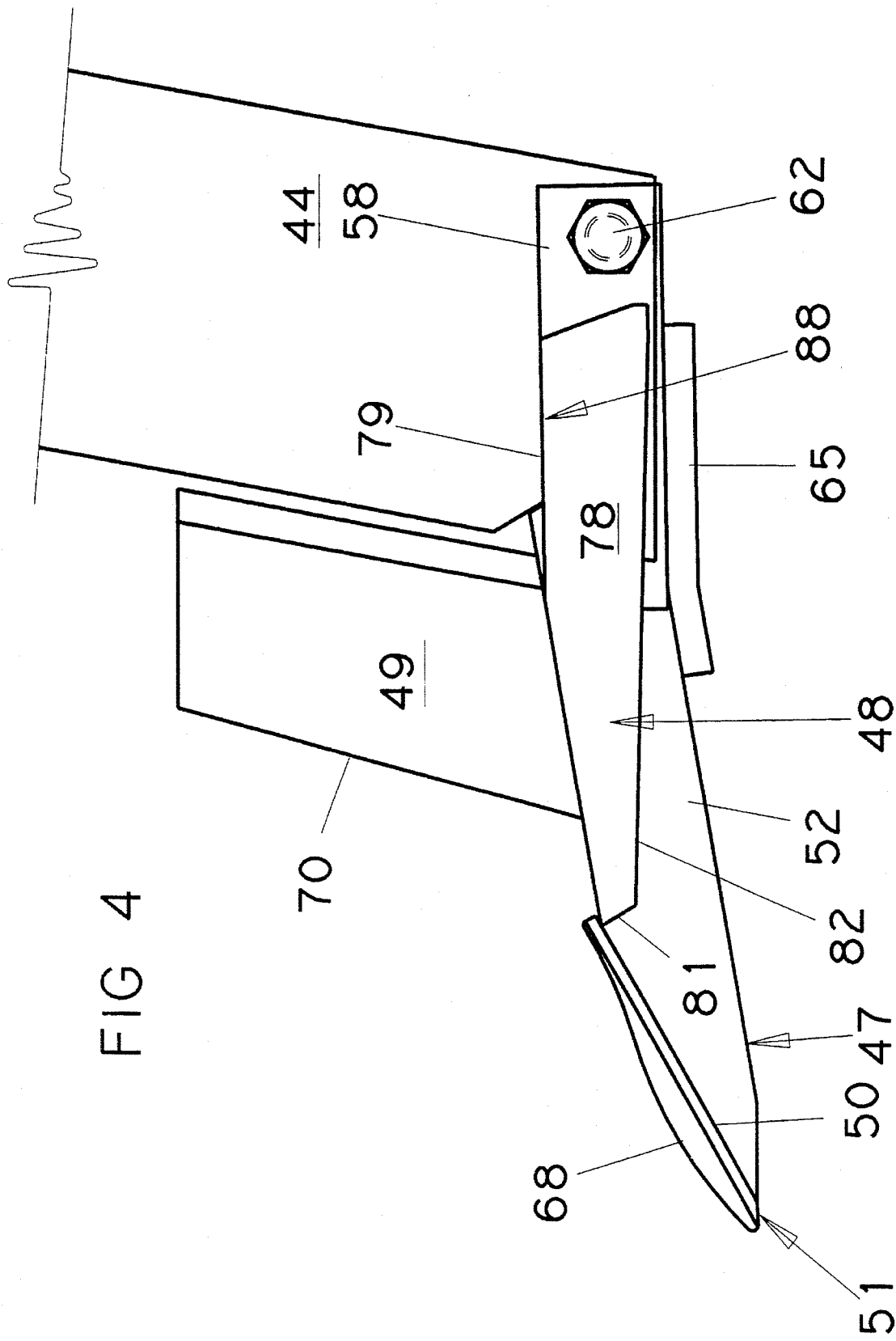

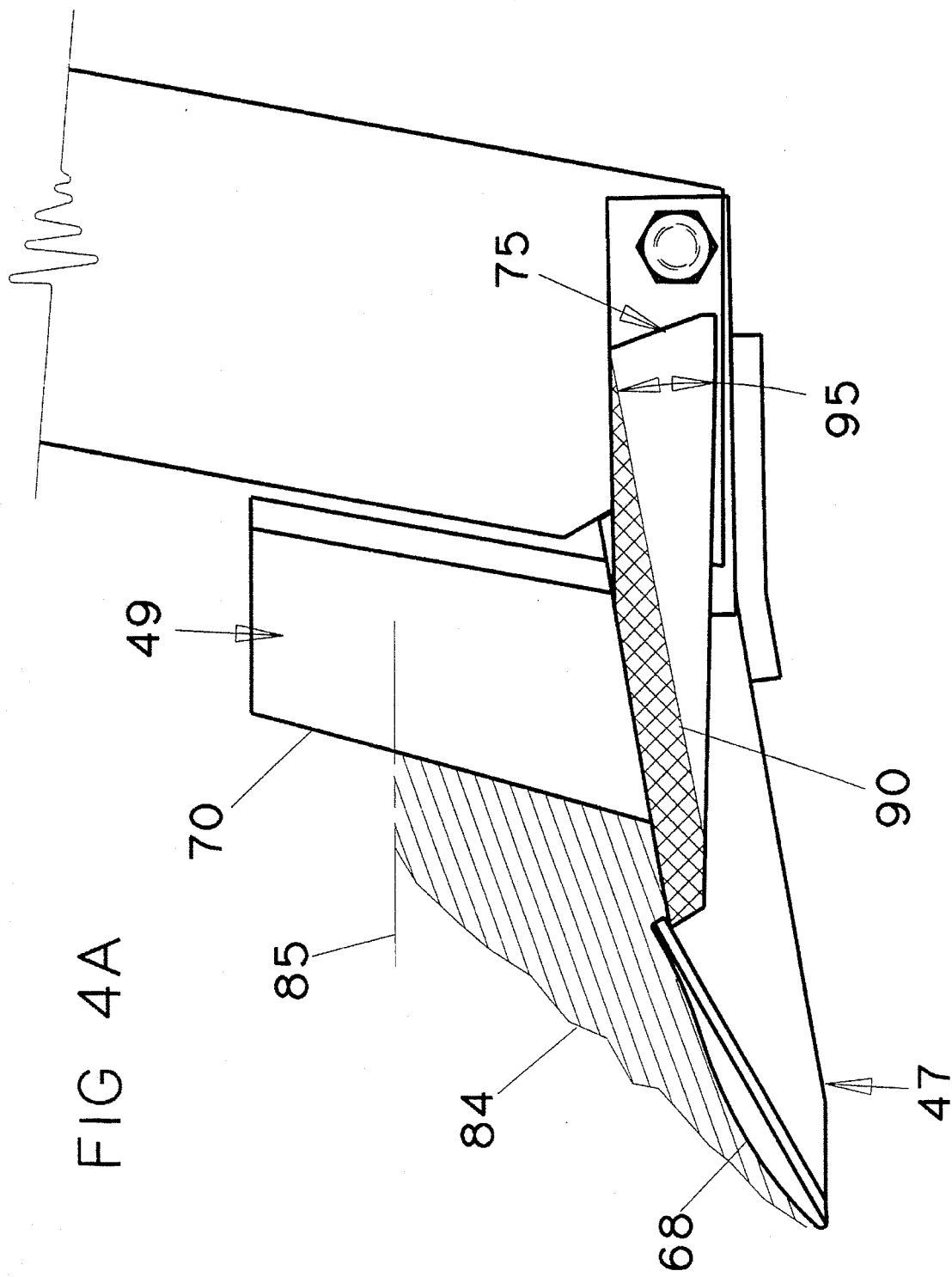

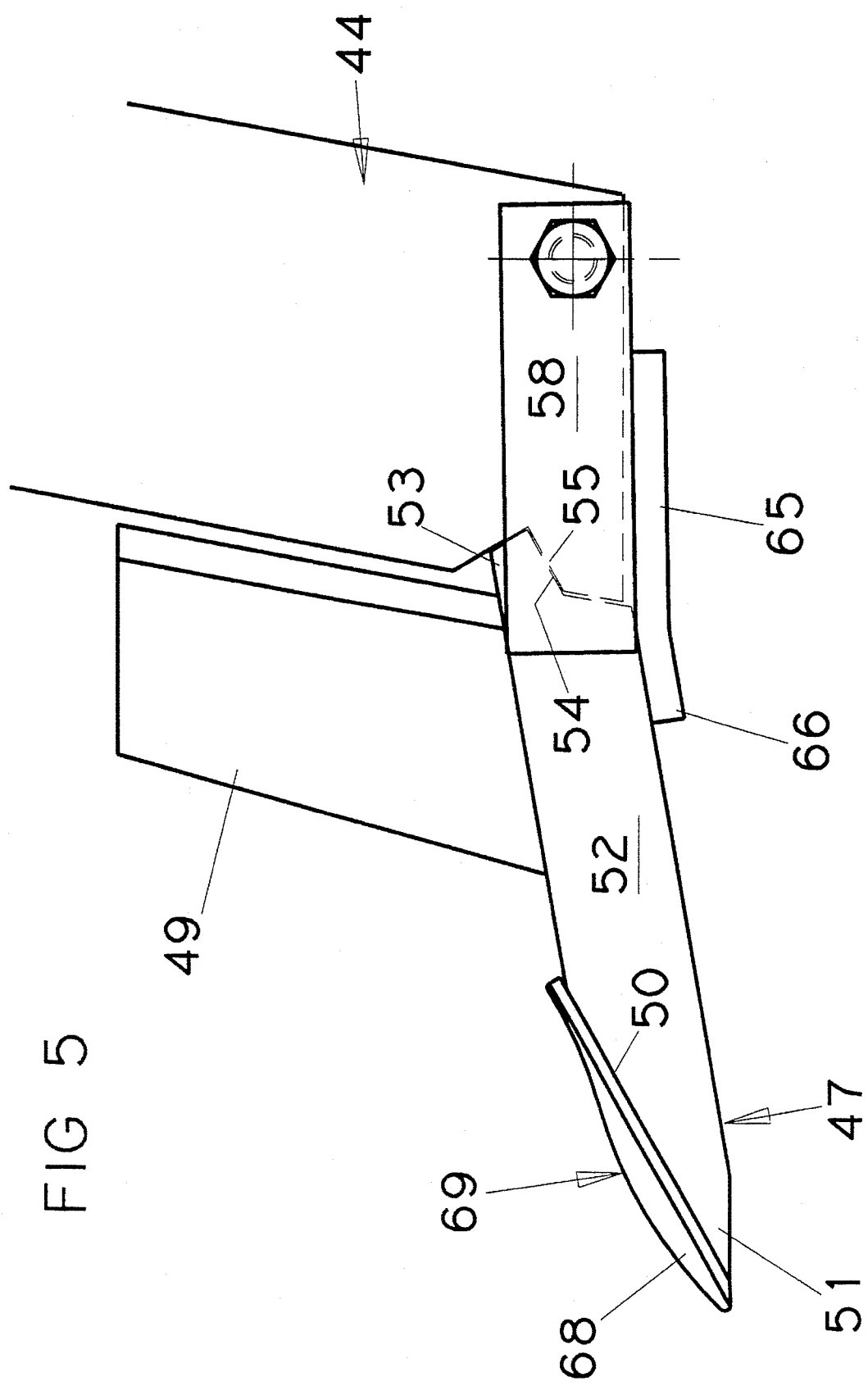

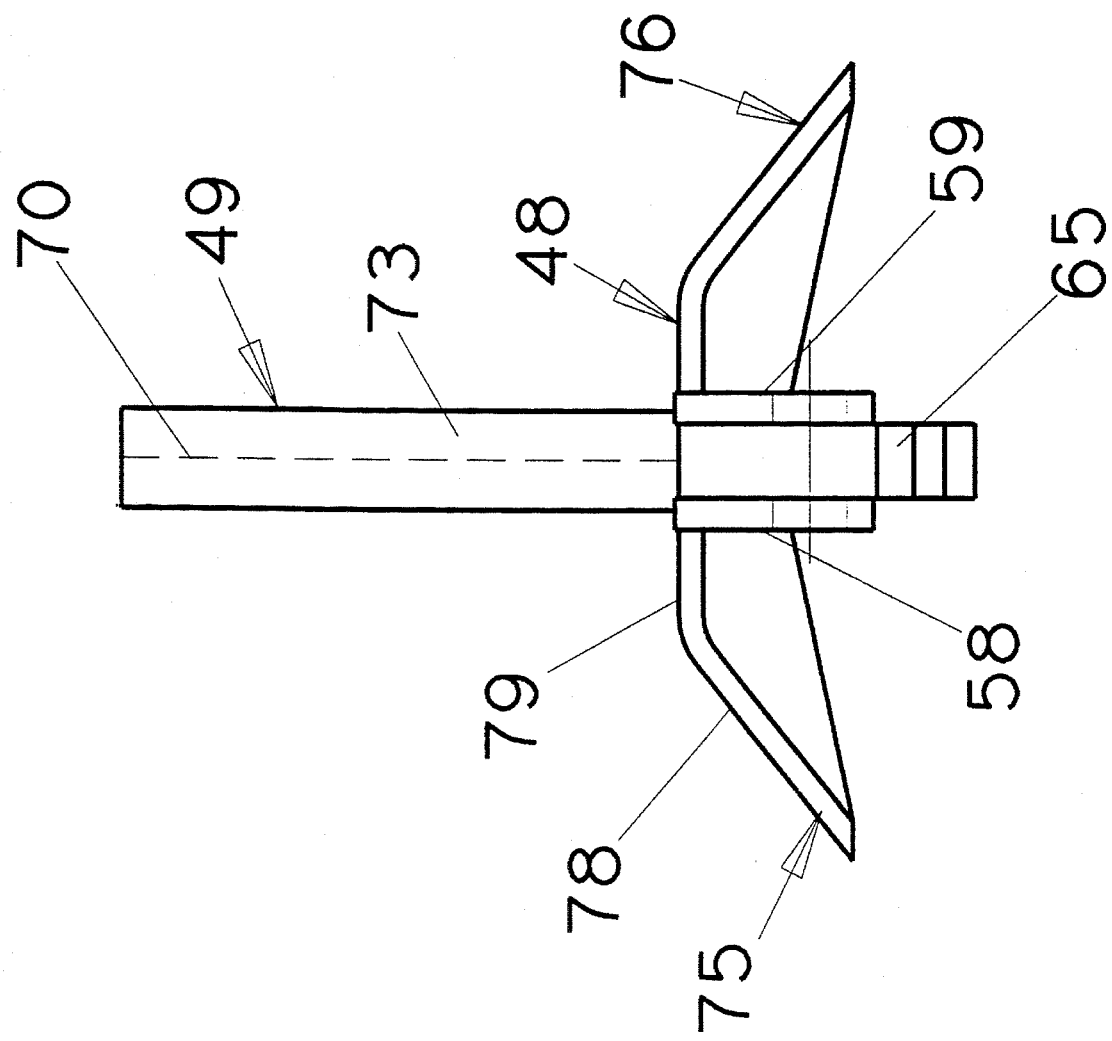

PRIMARY TILLAGE UNIT WITH REDUCED DISTURBANCE OF SURFACE SOIL AND RESIDUE

FIELD OF THE INVENTION

The present invention relates to agricultural tillage apparatus; and more particularly, it relates to an improved primary tillage unit which fractures and loosens soil to a depth associated with primary tillage while reducing the disturbance of the surface soil and residue and without creating a plow sole or "hardpan".

BACKGROUND OF THE INVENTION

It has for years been recognized that soil erosion occurs as a result of tilling the soil. Normally, great erosion occurs when the tilling is deeper and the soil is turned, as with moldboard plows, which operate at depths of 6 to 10 inches or more. This depth range is referred to herein as "primary tillage" and it is distinguished, for example, from disc tillage and various cultivation techniques such as discs, "spider" wheels and sweeps, as well as combinations of devices which normally cultivate the surface and to nominal depths of two inches, but as deep as 3–4 inches. Despite the possible disadvantage of erosion, some primary tillage is highly desirable to increase the retention and absorption of water; to fracture the soil to promote root development and increase crop yield; and to break up the plow sole (which is a compacted layer of soil found most often just below the working level of some primary tillage implements, such as the moldboard plow).

Farming practices in those areas where the soil undergoes greater erosion have changed substantially over the last few decades. Very little, if any, moldboard plowing is done in these areas. Chisel plows have become popular, particularly over moldboard plows, because they leave more residue on the surface which reduces runoff of surface soil. Mold-board plows turn the soil, burying the residue, and leave the soil on the surface exposed and unprotected from water runoff. Many farmers have changed to conservation farming techniques such as minimum tillage (or "direct seeding" as it is sometimes referred to) in order to reduce soil erosion.

In an effort to reduce erosion, it has become desirable to leave as much of the previous crop residue on the surface as possible, consistent with the farmer's desire to perform some tillage to increase moisture absorption and retention. Residue on the surface not only holds the soil, but also increases moisture retention and promotes seed emergence. This is particularly important in those fields which carry the "H.E.L." designation of the U.S. Department of Agriculture (for "highly erodible land").

The desire to leave crop residue in place on the surface of the soil has been made more difficult by the use of tractors capable of conducting tillage operations at ground speeds of up to seven miles per hour. The shanks of many chisel plows currently available commercially have a thickness of about an inch and a quarter or greater. Because of the thickness, the leading edge of the shank is formed into a tapered wedge to fracture and part the soil. The disadvantage of this type of shank is that when operating at primary tillage depths at ground speeds greater than about two to three miles per hour, the soil and residue at the surface are struck by the shank so that they are thrown to the side, leaving a furrow behind the shank which is wider than the shank. As it rains, the water gathers in these furrows and the furrows become rivulets. The flowing water carries with it the exposed surface soil in the furrows, thereby creating erosion. At higher tractor speeds, the furrow may be 3–4 inches wide and free of any substantial amount of residue that would help reduce erosion.

There are other disadvantages to some current "state of the art" chisel plows, which are, as persons skilled in this art are aware, primary tillage tools. The term "primary tillage" is intended to mean tillage at a depth at least six inches—and up to twelve or fourteen inches—below the surface. In chisel plows having parabolic shanks, as distinguished from the flat, rigid shanks of the present invention, the lifting action of the shank and the point increases the depth and width of the surface furrow formed, and this increases soil erosion. Moreover, many designs of current use impact the soil in an effort to pulverize as much of the soil as possible, like a cultivator sweep, in hopes of increasing moisture retention. However, particularly at speeds which many farmers currently prefer to operate, the effect is to create more fine particles, rather than larger clods; and this tendency further increases erosion because the "fines" are more easily washed away in heavier downpours.

SUMMARY OF THE INVENTION

The present invention is intended to permit a farmer to till the soil at a depth of about six to ten or more inches and at speeds of up to seven miles per hour while: (1) leaving only a very narrow furrow; (2) without clearing surface residue in its path; (3) reducing the soil "fines" that are produced, even at high speeds; and (4) without creating a plow sole.

The present invention is a primary tillage unit which includes a coulter assembly followed by a novel chisel plow. The coulter is mounted in a leading position on the implement frame. The implement, of course, is drawn by a tractor. A number of similar tillage units, each including a coulter and a plow are mounted at desired lateral spacings along the frame, as with conventional tillage implements. The units may be staggered in a fore-to-aft direction, if desired. The shank of the chisel plow is aligned with the coulter and follows in the slot formed by the coulter.

The chisel shank includes a generally vertical bar having a width which preferably is less than approximately one inch. A working unit is mounted to the bottom of the shank.

The working unit includes a point and a delta wing lift assembly above and behind the point. The tip of the plow point includes an inclined upper cutting edge which engages and fractures the soil in a zone around and above the tip. The fracture zone generated by the point is sometimes referred to as the "forward" fracture zone in contrast with the lateral fracture zone created by the wings.

As will be appreciated from an understanding of the entire disclosure, the extent of the forward fracture zone cannot be observed or determined quantitatively since the point is followed immediately by the delta wing which further lifts and fractures the soil. And the extent of the forward fracture zone about the point varies with soil conditions, moisture, operating speed and other variables. However, based on my experience and the overall results achieved, I believe the forward fracture zone extends upwardly to the bottom of the slot formed by the coulter, as well as radially outwardly to lateral areas of the shank. Moreover, the delta wing provides swept-back lift surfaces rearwardly of and above the point yet forwardly of the shank to slightly lift the soil in the forward fracture zone and to further extend the forward fracture zone to the surface of the soil and laterally to communicate with the fracture zones of adjacent tillage units. The wings thus create the lateral fracture zone.

Above the point and in front of the lower front edge of the shank is a "shark fin" which provides a tapered leading edge in the area of the forward fracture zone to facilitate a parting of the soil in the area beneath the coulter slot yet forwardly of the shank.

Thus, in summary, the coulter forms a first slot which may extend downwardly approximately half the operating depth of the shank. The point, extending forwardly of the shank, creates a forward fracture zone well in front of the shank and which extends upwardly to the coulter slot and laterally of the shank but does not extend to create a continuous lateral fracturing between points. This loosens the soil in front of the shank. That loosened soil is further fractured by the action of the delta wing which is designed to accomplish substantially all of its lift in those areas immediately adjacent the shank before the shank actually passes through the soil. Moreover, the shark fin is designed and located to part the soil in front of the shank before the shank passes. The delta wing also extends to the fracture zone laterally so that all the soil along the swath being worked is fractured.

The action of the point, fin and delta wing creates a "hammock" or concave curvature to the surface of the soil between adjacent shanks. This permits the surface soil to raise as a slab adjacent the sides of the shank without breaking apart or "slabbing", and permits the shank to pass through without disturbing the surface of the soil to any substantial degree. Moreover, and equally important, the shank is permitted to pass through a slot in the soil without dislodging small clods of soil or other broken portions at the top of the furrow in which the shank traverses the soil.

Thus, the present invention enables the tillage units on an implement to traverse the soil and accomplish primary tillage while leaving the residue on the surface of the soil and without substantially disturbing the soil at the surface, and without throwing materials (soil or residue) from the furrow in which the shank traverses the soil. Moreover, this is accomplished while permitting the farmer to accomplish primary (i.e., deep) tillage at ground speeds up to five or seven mph, depending upon conditions, while maintaining the residue on the surface of the soil and without creating a plow sole.

Thus, by the time the shank traverses the soil, there is a minimum effect on the surface of the soil because the shank travels in the slot formed by the coulter at the upper level, and the surface has been parted by the "hammock" effect to a degree sufficient to permit the shank to pass without kicking soil out of the furrow. At the lower levels, the shank travels in the forward fracture zone of parted and loosened soil created by the cooperative action between the coulter and plow point; and the shank is preceded by the soil-parting effect of the fin. The thinness of the shank and point, and the cooperative action between the coulter, fin, point, and wings reduce the impact of the shank on the soil near the surface of the soil, thereby reducing the width and depth of the furrow formed by the shank and also reducing the disturbance of the soil and residue at the surface.

Other features and advantages of the present invention will be apparent to persons skilled in the art from the following detailed description of various embodiments accompanied by the drawing, wherein like reference numerals will refer to similar parts in the various views.

BRIEF DESCRIPTION OF THE DRAWINGS

FIG. 4 is a left side view of the working unit of FIG. 3 mounted to a shank;

FIGS. 3A and 4A correspond respectively to the views of FIGS. 3 and 4, and illustrate the areas where soil flows and lifts over the lift surfaces of the delta wing of the working unit.;

FIG. 5 is a side view of the working unit and shank, similar to FIG. 4, but with the delta wing removed to show the construction;

FIG. 6 is a rear view of the working unit shown in FIGS. 3 and 4;

DETAILED DESCRIPTION OF THE PREFERRED EMBODIMENTS

Figure 1:
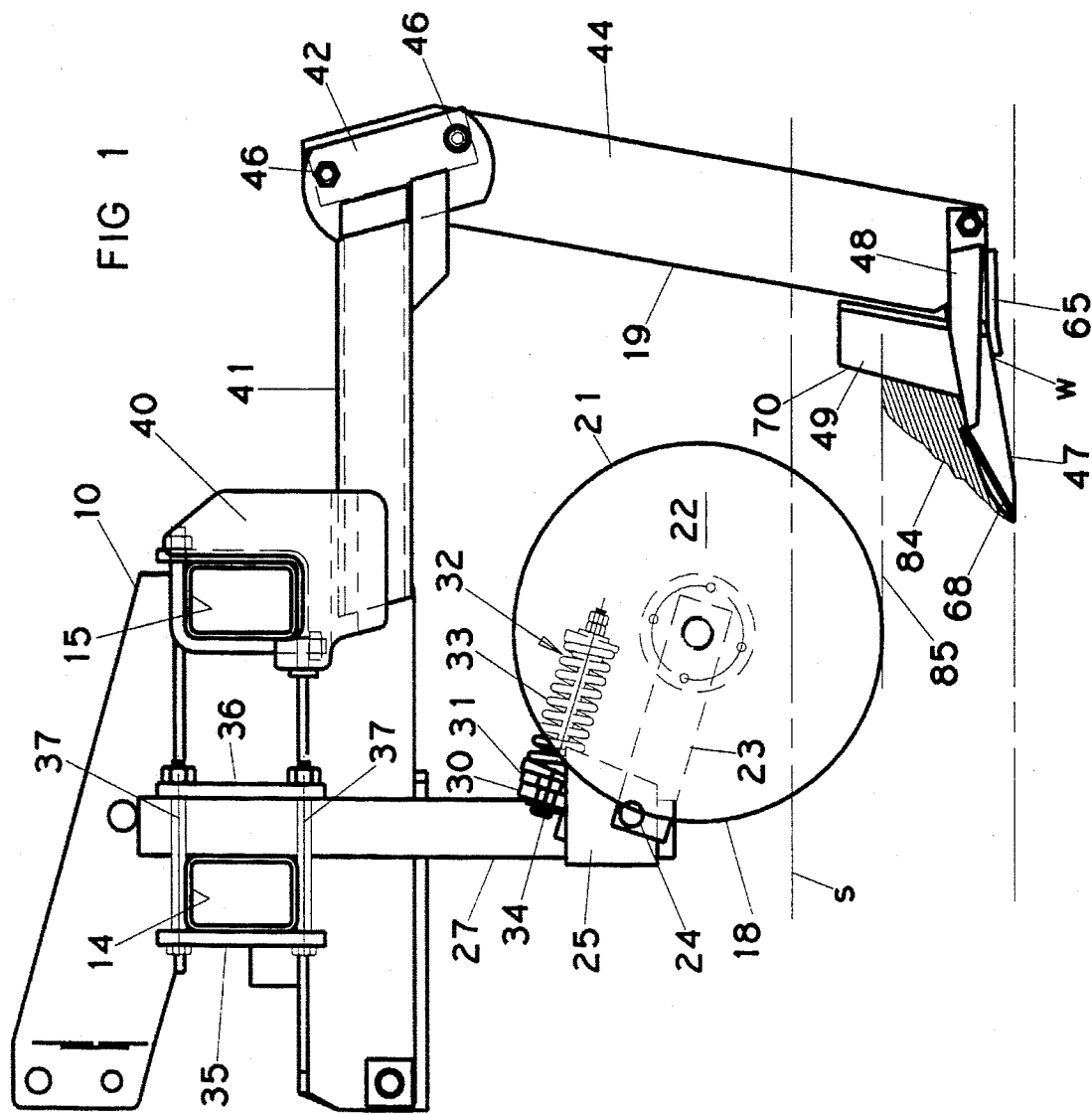
FIG. 1 is a side elevation view of a tillage unit incorporating the present invention, with the direction of travel being toward the left as viewed in the drawing.

Turning then to the drawing, reference numeral 10 generally designates an implement frame. In the illustrated embodiment, the implement is adapted to be mounted to the three-point hitch of an agricultural tractor—that is, the frame is cantilevered to the tractor hitch, as known to those skilled in the art, by means of an upper mounting bracket 11 and two lower mounting brackets, the left one being seen in FIG. 1 and designated by reference numeral 12.

For larger widths, the implement may be mounted to a tractor drawbar and supported by its own wheels. As persons skilled in the art will appreciate, the present invention will function equally effectively in either a cantilevered implement or a drawn implement having its own support wheels.

Turning now to the implement frame in more detail, it includes a forward transverse mounting bar 14 and a similar rear transverse mounting bar 15. The forward and rear mounting bars 14, 15 are connected together by transverse members to form a rigid frame or "toolbar" as it is sometimes referred to. As used herein, the terms "frame" and "toolbar" are interchangeable and refer to implement frames of either the cantilevered type or the drawn type.

Figure 2:
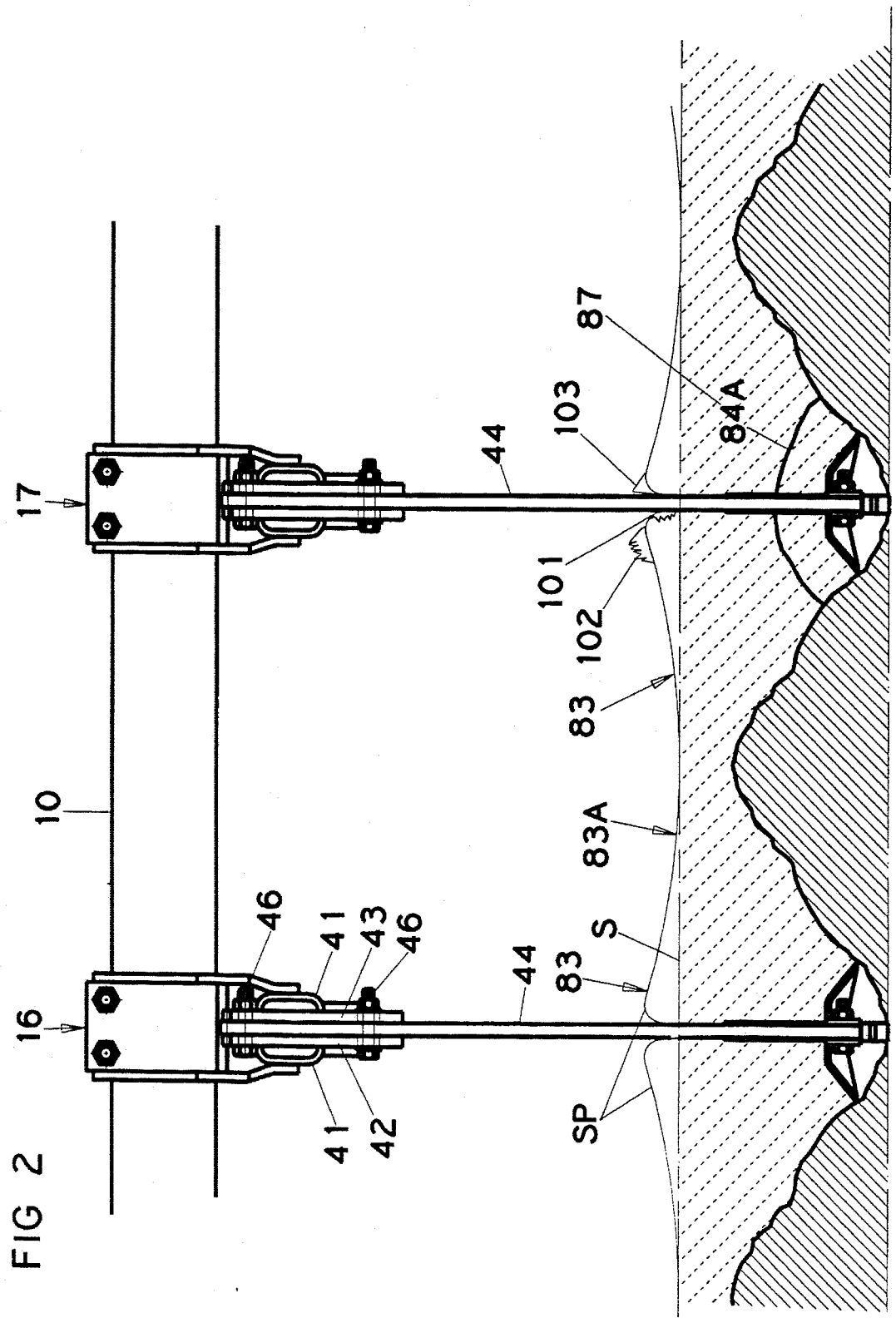
FIG. 2 is a rear view of the apparatus of FIG. 1, with the forward coulter assembly omitted and showing, in idealized form, profiles of the soil surface after plowing, and profiles of loosened and untilled soil sections.

The present invention contemplates that a number of individual tillage units, each including a coulter and chisel plow, be mounted at locations spaced laterally along the implement frame. Referring to FIG. 2, one such tillage unit is generally designated 16, and a second one is designated 17, the unit 16 being on the left side of the unit 17. The spacing of the units may be adjusted, but generally the spacing is uniform and in the range of 24 in. to 40 in. The overall width of the implement in the use position may be typically in the range of 10 feet to a width up to 30 feet, if desired. A description of one of the tillage units will be sufficient for those skilled in the art to understand the invention because all of the tillage units used on the frame may be identical.

Referring now to FIG. 1, each tillage unit includes a coulter assembly 18 and a novel chisel plow 19 mounted behind an associated coulter assembly. Referring first to the coulter assembly 18, it includes a planar coulter disc or blade 21 conventionally mounted by means of hub shown in phantom at 22 to a support arm 23. The support arm 23 is pivotally mounted by means of a pin or shaft 24 to an angle bracket 25, the forward portion of which is mounted to a vertical mounting bar 27. The pin 24 is also journalled in the bar 27, and it has welded to it a plate 30. A spring seat plate 31 is welded between the bracket 25 and the vertical mounting bar 27 so that it is fixed. A coil spring assembly generally designated 32 and including a spring 33 and spring bolt 34 is conventionally mounted to force the movable plate 30 against the fixed plate 31, thereby urging the support arm 23 clockwise in FIG. 1 to its lowered position of normal use as seen in the drawing.

As the coulter encounters an obstruction, the support arm 23 is permitted to rotate counterclockwise with the shaft 24 to rotate the movable plate 30 in the same direction and compress the spring 33 by center bolt 34. The spring 33 thus acts to cushion shock and provide a restoring force for the coulter blade 21 to resume its normal use depth.

The vertical mounting bar 27 is mounted to the forward tubular frame member 14 by means of forward and rear plates 35, 36, mounting bolts 37 and nuts, as seen.

Turning now to the chisel plow 19, a bracket 40 is bolted to the rear tubular frame member 15. A rear extension 41 is mounted to the lower portion of the bracket 40; and first and second side plates 42, 43 (FIG. 2) are welded to the extension 41. A shank 44 is secured between the side plates 42, 43 by means of bolts 46.

As seen by comparing FIGS. 1 and 2, the shank 44 is formed of thin flat stock, having a width preferably about ¾ in., and less than about 1.0 in. However, it has a substantial fore-to-aft dimension for strength and rigidity. The shank 44 is aligned with the coulter blade 21 such that the shank is centered on the blade and is located in the slot formed by the coulter 21 during operation.

At the bottom of the shank 44, there is mounted a soil-working unit (or simply "working unit") generally designated W in FIG. 1. The principal components of the working unit are a plow point 47, a delta wing assembly generally designated 48 and an upright fin 49, sometimes referred to as a "shark" fin. Referring to FIGS. 1, 4 and 5, the point 47 is an elongated piece of metal having a generally rectangular cross section which extends forwardly and slightly downwardly of the shank 44. It has a width only slightly greater than the shank. The point 47 includes a forward surface 50 which is inclined upwardly and rearwardly of a leading edge or nose 51. Behind the inclined surface 50 there is an elongated mid-section 52 to which the individual segments of the delta wing assembly 48 are welded, as will be described below. At the rear of the point 47 there is formed a projection 53 which provides a bearing surface 54 which abuts a corresponding bearing surface 55 formed by means of a notch in the leading edge in the shank 44 near the bottom, best seen in FIG. 5.

Figure 3:
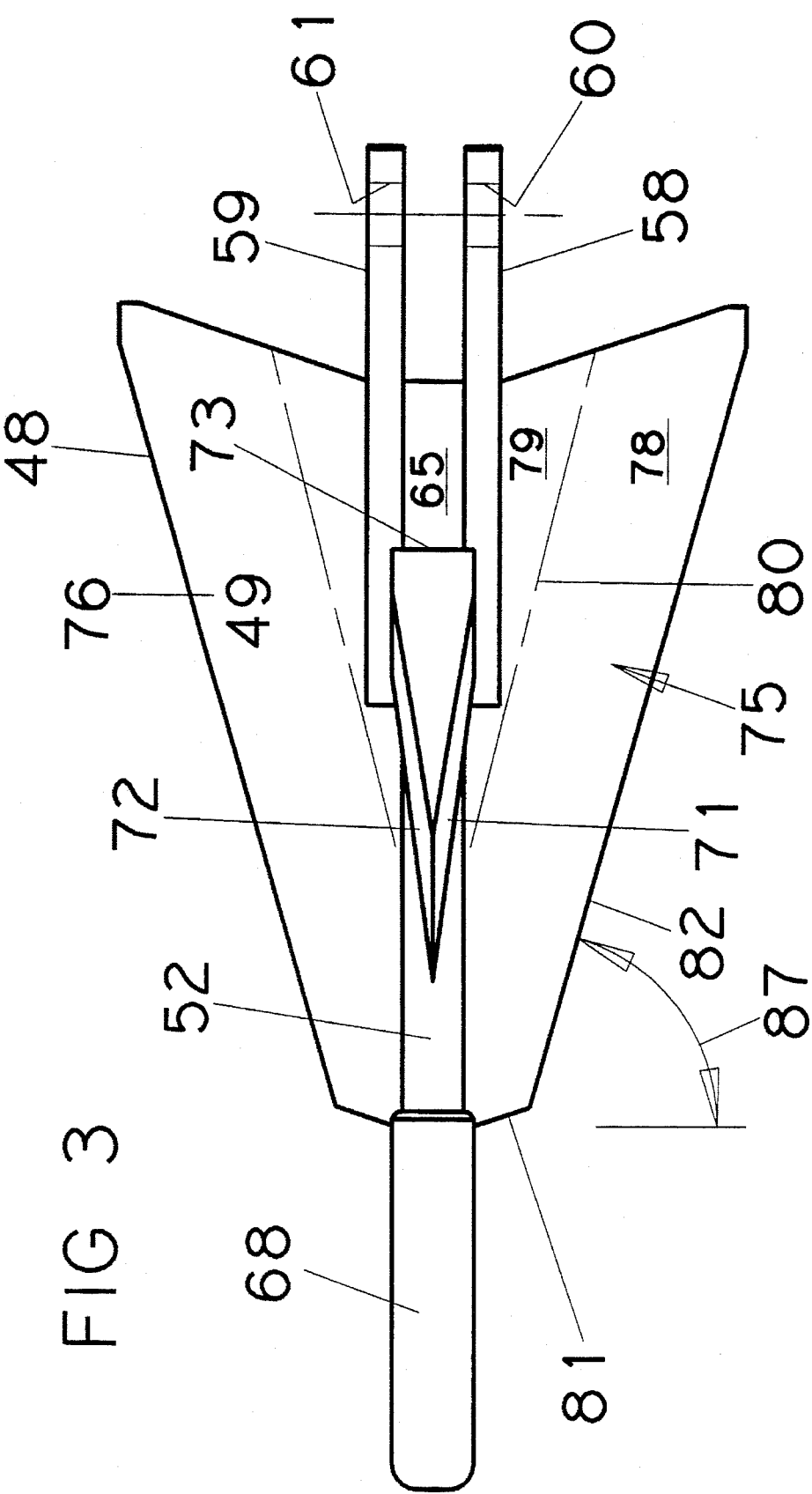
FIG. 3 is a plan view of the working unit of the plow.

As best seen in FIGS. 3 and 5, first and second side plates 58, 59 are welded respectively to the left and right sides of the rear portion of the plate 47, and they extend rearwardly to straddle the lower portion of the shank 44. Apertures 60, 61 are formed respectively in the rear portions of the plates 58, 59 and in alignment with a corresponding aperture in the shank 44 to receive a mounting bolt designated 62 in FIG. 4 and a nut seen in FIG. 2. This arrangement permits the entire working unit W to be removed and replaced, if worn or damaged.

Referring to FIGS. 1, 4 and 5, a brace 65 is welded to the bottom surfaces of the side plates 58, 59. Brace 65 extends forwardly and bends slightly downwardly as seen at 66 in FIG. 5, where it is welded to the bottom surface of the rear of the elongated mid-section 52 of the point 47 to provide additional strength to the point and to add strength and rigidity to the working unit as a whole.

At the forward portion of the point 47, on the inclined surface 50, there is formed a work surface 68 of hardened metal for increasing the wear on that portion of the point which continuously engages the soil and fractures it. As seen in FIG. 5, the work surface 68 bulges upwardly in the region designated 69, resembling a "moose" nose to provide additional thickness of the hardened metal where it is needed most. The work surface 60 could equally well be made to be replaceable on the point 47, as is done, for example, in the teeth of backhoe buckets.

Referring now to FIGS. 3 and 4, the fin 49 includes a leading edge 70 which is inclined slightly rearwardly and upwardly, and generally parallel to the slight rearward inclination of the shank 44, as best seen in FIGS. 4 and 5. The fin 49 includes first and second tapered surfaces, 71, 72 extending rearwardly of the leading edge 70, and ending at a rear surface 73 which is slightly wider than the width of the shank 44. The purpose of the fin is to part the soil more gradually than it would occur if the soil were engaged by the flat forward surface of the shank. The fin 70 is welded to the upper surface of the midsection 52 of the point. As will be described further below, the height of the fin is such that the uppermost portion of the fin preferably rides in the bottom of the slot formed by the coulter, and the fin 70 operates primarily in the vertical portion of a "forward" zone of fractured soil created by the work surface 68. That is, the fin 49 does not normally part or cut through compacted soil. Rather, it is to provide a more "soil dynamic" cutting profile for the shank and to reduce the energy imparted by the shank (which has no soil-working function but acts only to support the point and delta wing) as the shank traverses the soil at higher ground seeds.

As seen best in FIGS. 3 and 6, the delta wing assembly 48 includes left and right side wing sections 75, 76 which are mirror images of each other so that only one wing section need be described in further detail. Wing section 75 includes a swept-back, inclined soil lift section 78 and an upper, horizontal section 79 which is sometimes referred to as a "land". The front or upper surface of the lift section 78 provides a soil-engaging work or "lift" surface which provides the main structure for lifting and fracturing the soil being worked behind the point and laterally of the shank.

Referring to FIG. 4, the forward portion of the work surface of the lift section 78 conforms to the inclination of the intermediate portion 52 of the point 47; and it then tapers upwardly and rearwardly until it meets with the land portion 79. The lift section 78 and land 79 may be formed from the same piece of metal by forming (i.e. bending) along a line illustrated at 80 in FIG. 3. The inner side of the upper surface of the land 79 conforms to the upper surface of the side plate 58 which mounts the working unit to the bottom of the shank.

As seen in FIG. 3, a leading edge 81 of the lift section 78 is inclined rearwardly at a comparatively small angle relative to a line transverse to the direction of travel, for a short lateral distance, and the leading edge 82 of the main portion of the lift section 78 is swept back at a considerably larger angle relative to a vertical plane transverse to the direction of travel, the angle being designated 87 in FIG. 3. The leading edge 82 of the lift section (or surface) engages and cuts through soil which is more compacted than that engaged by the inner leading edge 81 which is adjacent the fracture zone created by the work surface 68 on the point, as will be appreciate from subsequent description of the operation of the work unit.

Operation of the Embodiment of FIGS. 1–6

The coulter is set to operate at a depth of approximately three to five inches, depending on the overall plowing depth desired. That is, the lowest edge of the coulter is approximately 3–5 inches beneath the idealized horizontal surface of the soil designated by S in FIG. 1. This is roughly half the operating depth of the point 47. The coulter 21, plow shank 44 and plow point 47 are substantially in the same vertical "plane" (obviously, each of these elements has some width).

Referring to FIG. 1, the leading, work surface or nose 68 of the point 47 lifts and fractures the soil in a first fracture zone (the "forward" fracture zone) illustrated by the line 84 in FIG. 1, as seen from the side, and by the profile line 84A in FIG. 2, as seen from the rear, but before the delta wing acts to further fracture the soil. Ideally, the fracture zone of the point extends upwardly to communicate with the bottom of the slot formed by the coulter 21 and generally indicated by the horizontal chain line 85 in FIG. 1. Thus, the leading edge 70 of the fin 49 operates, in its upper section, in the slot formed by the coulter, and in its lower portion, in the fractured, loosened soil formed by the point 47. The fin 49 then parts the loosened soil and moves it laterally to flow past the sides of the shank 44.

As can be seen in FIG. 6, the width of the rear surface 73 of the fin 49 is slightly larger than the width of the shank (as determined by the spacing of the opposing surfaces of the side plates 58, 59). As viewed from the rear, the fracture zone formed by the leading, inclined work surface 68 of the point 47 is seen in FIG. 2, again represented in idealized form by the profile line 84A. As can be seen by comparing FIGS. 1 and 2 the leading edge 70 of the fin 49, for the most part, traverses soil which has either been parted by the coulter 21, or fractured by the point 47. The inclined or tapered surfaces of the fin then simply displace the fractured soil (while obviously further fracturing it, also) to the side and beyond the sides of the shank 44.

After the soil is fractured by the point in the forward fracture zone, as discussed above, the wings 75, 76, with their slight lifting motion and narrow lateral extension, raise the soil on either side of the fracture zone and lift the soil without displacing it laterally to any substantial extent. Ideally, the surface of the soil and remnant residue are left substantially intact. Moreover, the facing wings of adjacent tillage units (i.e., the left wing of the unit on the right and the right wing of the unit on the left) cooperate to fracture and loosen the soil in the idealized profile designated SP in FIG. 2 (the lateral or second fracture zone), lifting the soil edges near the shank and forming a slight central trough (arrow 83A in FIG. 2) at the mid-point between adjacent shanks. At the edges of the median strip between shanks, that is, right next to the shanks, the lift surfaces force the cut soil edges upward and create the "hammock" effect illustrated by arrows 83 and discussed below, to permit passage of the shank. The broken soil is left in larger clods rather than as fine particles; and the residue on the surface is left substantially intact and in place.

The fact that the soil is fractured first and then lifted by the wings, together with the reduced engagement area of the wings, permits the soil to be loosened and the shank to pass without heaving the soil laterally. The thinness of the shank and point, and the alignment of shank and coulter further enable the tilled soil profile at the surface, as indicated particularly in the area designated SP, to be raised slightly above the normal horizontal surface of the soil designated by the chain line S with little or no disturbance of the surface soil and residue. There is thus formed a very narrow groove behind the shank of the tillage unit, with minimal disturbance of residue on the surface due to the fact that the soil is not lifted and thrown laterally under the action of the wings, shank and point, and because the coulter 21 cuts most of the residue before the shank 44 is pulled through the soil.

In reviewing the functions of the individual components of the plow unit, it would be well to keep in mind the overall purpose and effect of the plow unit, and to be aware of what is undesired in result. The function of the coulter is to form a slot and slightly part the soil, as well as to sever any residue straddling the path of the shank 44, to avoid the hairpinning of the residue around the leading edge of the shank. The coulter action reduces, but standing alone does not eliminate, the shank's engaging soil in front of it and the tendency to force the soil out of the furrow formed by the shank. That is to say, as the shank is pulled through the soil, the soil, unless provision is made, has nowhere to go and the leading edge of the shank, if provisions are not made, has a tendency to "kick" out or "blow" out soil in the form of small clods. What the present is designed to do, then, is to form the upper surface of the soil into a concave surface extending between the opposing sides of adjacent shanks 44. This is illustrated by the arrows 83 in FIG. 2. The concave surface, shown idealized in FIG. 2, is sometimes referred to as a "hammock" effect, and it causes the narrow slit formed by the coulter to widen, as will be further explained presently, to permit the shank to traverse the slot without substantial forceful engagement of compacted soil. Moreover, it is considered important that the soil adjacent the sides of the shank be loosened before the shank passes, as described more below.

The work surface 68 of the point 47 then fractures the soil in the first fracture zone as already described. This loosened the soil up to the coulter slot, before the fin 49 and just to the sides of the shank 44. In addition, however, as seen from FIGS. 1, 2 and 4, the soil-working portion of the point, namely, the work surface 68, is substantially entirely below the lift surfaces 78 of the delta wing assembly. This structure, in cooperation with the delta wing assembly, creates the "hill-and-valley" effect of untilled soil seen in FIG. 2 and avoids formation of a hardpan or plow sole even if the same field is plowed year after year at the same depth.

Turning now to the operation of the delta wing, and referring particularly to FIGS. 3A and 4A, the leading portions of the delta wing operate in soil loosened by the leading, work surface 68 of the point 47 (i.e., the forward fracture zone). The delta wing formation has a number of intended functions. It lifts the soil a controlled amount to extend the first fracture zone 84 to work all of the soil shown in the area of dotted cross hatch and generally designated 87 in FIG. 2 (the second or lateral fracture zone). The delta wing creates the hammock effect described above without disturbing the surface soil. It will be appreciated that the soil is thus loosened and fractured in a lateral zone which is continuous between adjacent shanks, at least for a limited depth beneath the surface and in continuously varying depth.

This function of lifting the soil and extending the fracture zone laterally without disturbing the surface is accomplished at higher speeds by controlling the amount of soil lift and the dislocation of soil, limiting the abruptness of the lift angle, and keeping the wing narrow. Moreover, the design of the delta wing is important not just in the dimensions leading to these functions, but also in its position relative to the shank 44. The reason for this is that the delta wing operates, at least in the regions immediately adjacent the shank, to effect substantially all of its lifting and fracturing in that particular region before the shank passes. This reduces the tendency to "blow out" soil from the furrow as the shank passes, although at higher speeds and for more aggressive plowing, rather abrupt pinnacles such as the one designated 103 and illustrated in FIG. 2 to the right of the right-side shank 44, may be created. If the working tool leaves a wide furrow, it is not necessarily desirable, but it is not as undesirable as creating "blow out" or actually displacing soil from the furrow, as illustrated at 102 in FIG. 2.

These functions of controlled, limited soil lift while fracturing the soil, as mentioned, are achieved by the design of the delta wing and its location in relation to the other elements of the working unit W. In the illustrated embodiment, the lift surface 78 of the wing section 75 is turned downwardly about the bend line 80 at an angle of approximately 35°, and the lift surface 78 is swept backwardly at an angle of approximately 72°. That is, the leading edge 82 forms an included angle of approximately 72° with a plane transverse of the direction of travel of the wing, and as illustrated at 87 in FIG. 3. Moreover, the height of soil lift as represented by the vertical arrow 88 in FIG. 4, extending between the horizontal leading edge 82 and the "land" 79 of the left-side delta wing section is approximately one inch. These specific numbers can vary to some extent, but the "bend" angle and the "sweep-back" angle are interrelated and the overall object of the delta wing must be kept in mind in determining these angles. That is, when operating at higher ground speeds, the delta wing structure is designed so that soil initially loosened by the leading portion of the point 47 is lifted and fractured, but flows over the delta wing during the controlled lift motion in a generally laminar flow pattern. That is, turning and "boiling" of the soil, as with cultivator sweeps is undesirable, as is "kicking" the soil, as with some chisel plows having curved or springy shanks. With the present invention, the soil is not displaced sideways substantially. There is some lateral force exerted by the displaced soil to establish the continuous fracture zone 87 between adjacent shanks. However, it is not the purpose of the delta wing to impart significant energy or momentum to the soil such as would create disruption at the surface to disturb the surface residue.

The dimensions given above are not critical, but the relationships between the angles are important, and any variations should keep in mind the functions described. For example, if the bend line 80 were less than 35° for the left wing section 75, the action on the soil would become less aggressive, so the "sweep back" angle 87 could be reduced, which has the effect of making the delta wing structure more aggressive. It is, perhaps, more realistic to think of an overall "lift" angle for the soil being worked by the delta wing side sections and as represented by the lift of the working section 90 of soil and diagrammatically illustrated by the angle 95 in FIG. 4A. It is this angle and the amount of vertical soil lift (represented by the distance 88 in FIG. 4) over the longitudinal length of the lifting action which are the significant parameters in this design and its successful operation at higher ground speeds. Experimentation has shown that the "lift" angle 95, which is a compound angle determined by both the extent to which the working surfaces of the wings are bent downwardly and the extent to which they are swept rearwardly, preferably is in the range of 8°–13°. The sweep back angle of the wing lift surfaces (87 in FIG. 3) preferably may be in the range of approximately 60°–75°. Moreover, the overall lift of the soil as indicated by the arrow 88 in FIG. 4 preferably is about 1.5 inches but may be up to 2 in. These parameters will produce varying results depending upon the soil condition, the soil type, the ground speed and various discontinuities encountered in the real world.

The trade-offs inherent in design will be further realized by appreciating that the greater the lift, the greater will be the fracturing effect on the soil. Moreover, the more "aggressive" is the angle of lift, the more aggressive will be the effect on the soil. It is the adjustment of these parameters to achieve the overall results depicted in FIG. 2 in an idealized form, which must be accomplished reliably to achieve the purpose of the present invention.

As can be seen from FIGS. 3A and 4A, the primary zones of soil working on the delta wing sections are shown in FIGS. 3A and 4A by the cross-hatched areas designated respectively 90, for the left-side delta wing section 75, and 91 for the right-side delta wing section 76. There are two points to be observed. First, by comparing FIGS. 3A and 4A, it can be seen that in the region immediately adjacent the sides of the shank, substantially all of the soil-lifting and working by the delta wing section is accomplished in front of the shank. Secondly, although they do some soil lifting and working, the outermost portions of the wing sections become progressively less effective in fracturing soil beyond the work zones 90, 91. The reason for this is that the amount of vertical lift achieved by the delta wing becomes progressively less toward the outermost, rear portions of the lift surfaces.

Description of Alternative Embodiments

Figure 7:
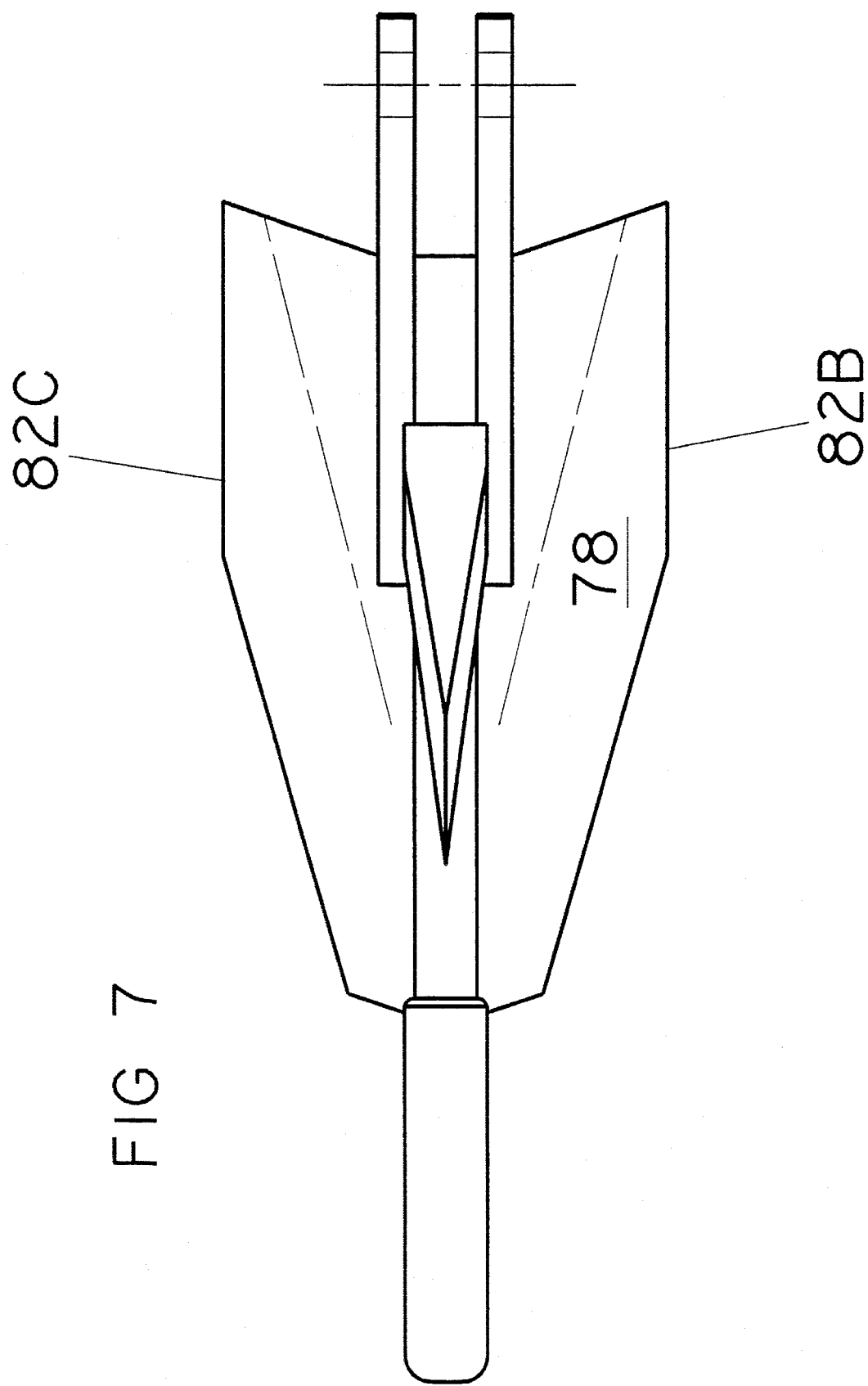
FIG. 7 is a plan view of an alternate embodiment of the working unit.

Turning to FIG. 7, there is shown an alternate embodiment similar to the embodiment of FIGS. 3 and 4 except that the outer edges of the delta wing are truncated, as at the lines 82b and 82c respectively for the left and right side wing sections. As can be seen in FIG. 3A, and as described above, the distal portions of the wing sections have reduced effect in creating lift, but they do have an effect in extending the fracture pattern laterally (that is, between adjacent plow units). Where it is not necessarily desired to have a continuous fracture pattern as described in the zone 87 in FIG. 2, or where it is desired simply to strip till and fracture only fairly narrow strips of soil, with a minimum of lateral soil fracture, but with the advantage of even reduced tendency to cause "blow out" the version of FIG. 7 may be desirable.

Figure 8:
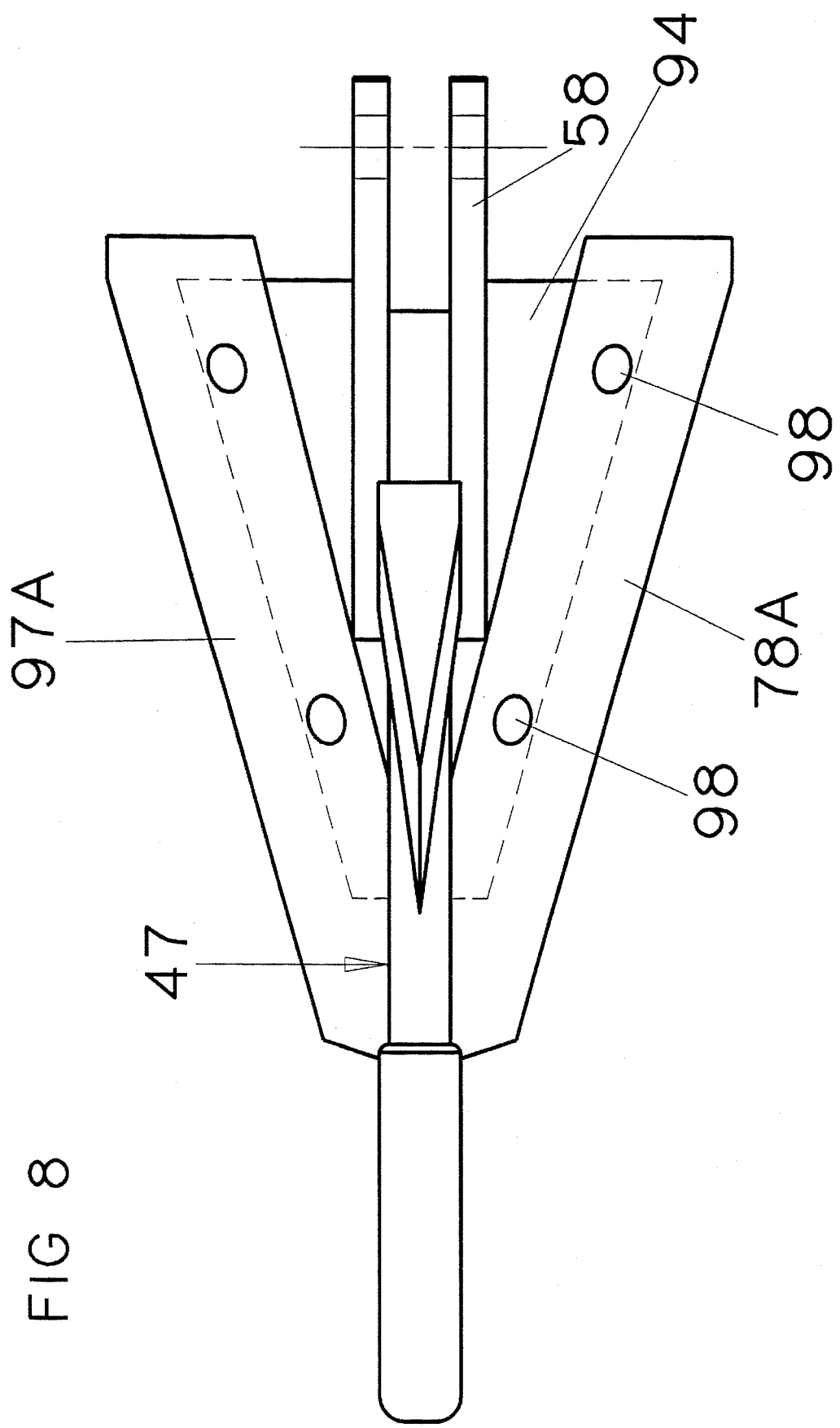
FIG. 8 is a plan view of another embodiment of the working unit with replaceable lay shares on the delta wing.
Figure 9:
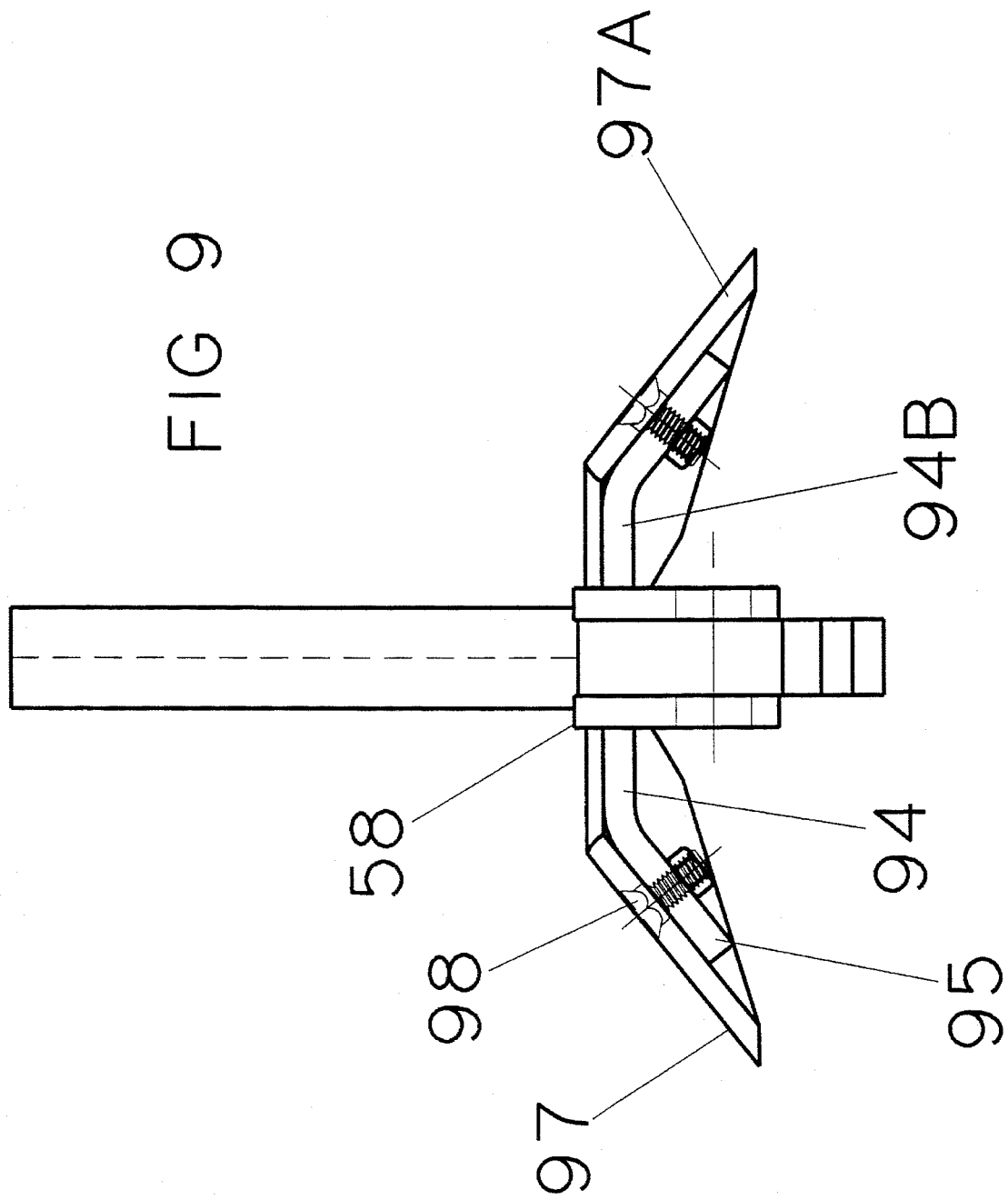
FIG. 9 is rear view of the embodiment of FIG. 8.

Turning now to FIGS. 8 and 9 there is shown a working unit similar to the one shown in FIGS. 3 and 4 except that it is modified so that the lift surfaces such as the one designated 78a, and corresponding to the lift surface 78 in FIG. 3, may be removed and replaced as they become worn or damaged. To accomplish this, a web 94 is welded to the brace 58 and to the rear of the point 47 for strength. As best seen in FIG. 8, the web 94 extends horizontally laterally from the brace 58 and thence downwardly at 95. The portions 94, 95 are formed at an angle which is the desired inclination of the lift surface, and a separate plate of hardened metal 97 is secured to the web 94 by counter-sunk bolts 98. Otherwise, the shape of the hardened metal plate 97 is substantially identical to that of the lift surface 78 in the embodiment of FIG. 3. A similar hardened metal plate 97a is mounted to a similar web section 94b on the right side of the embodiment of FIGS. 8 and 9.

Figure 10:
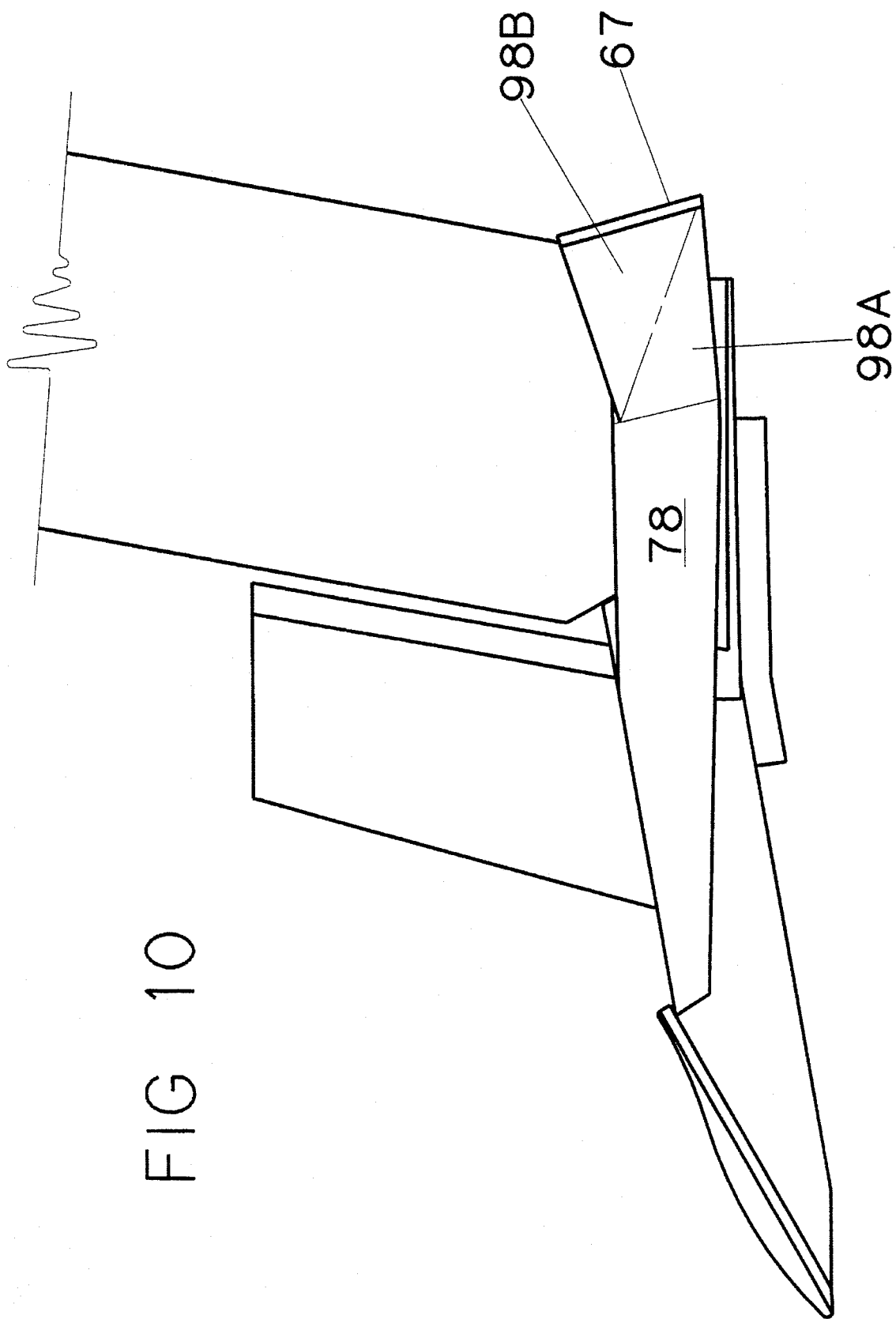
FIGS. 10 is a left-side view of another embodiment of the working unit.
Figure 11:
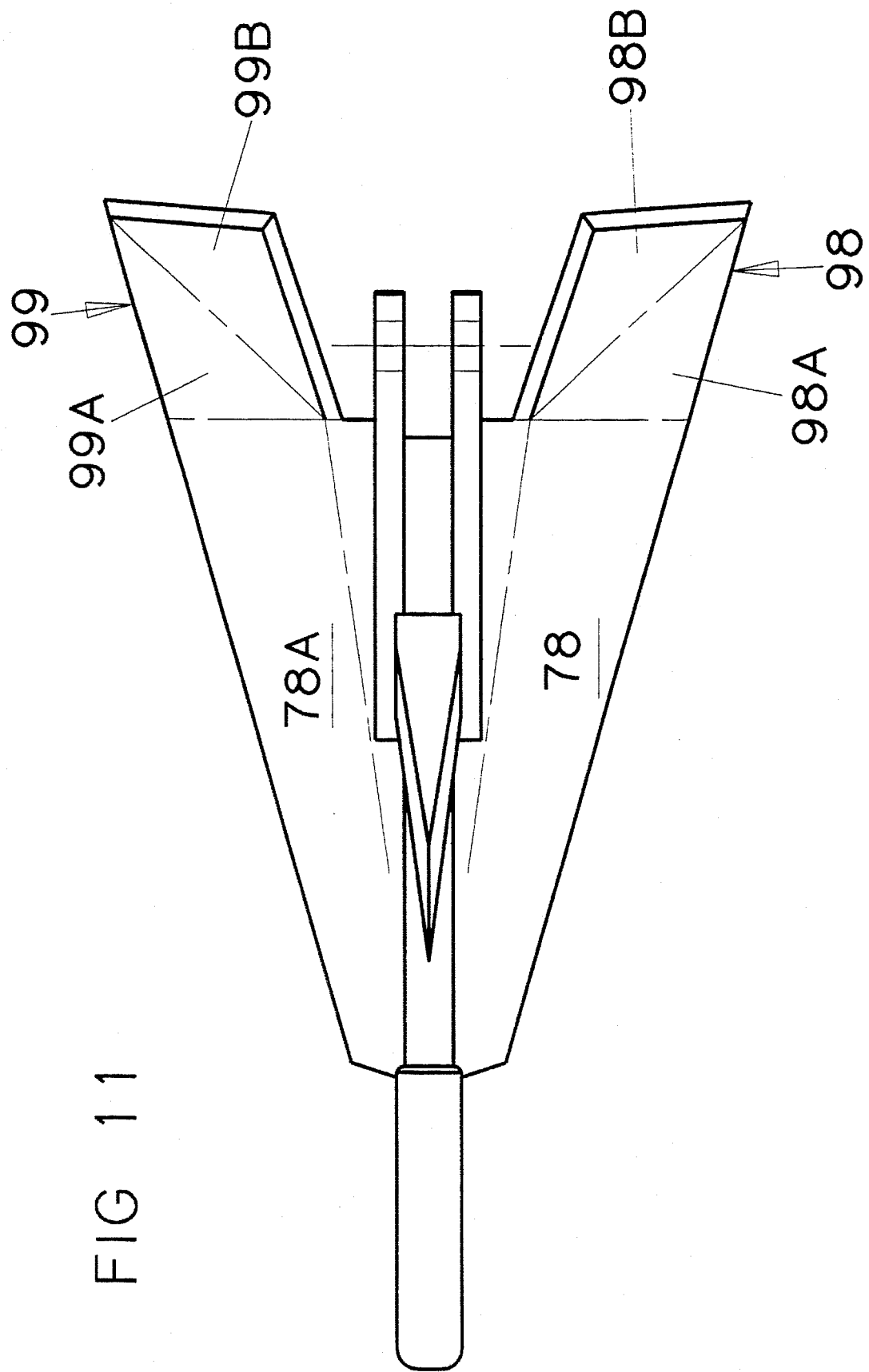
FIG. 11 is a plan view of the working unit of FIG. 10.
Figure 12:
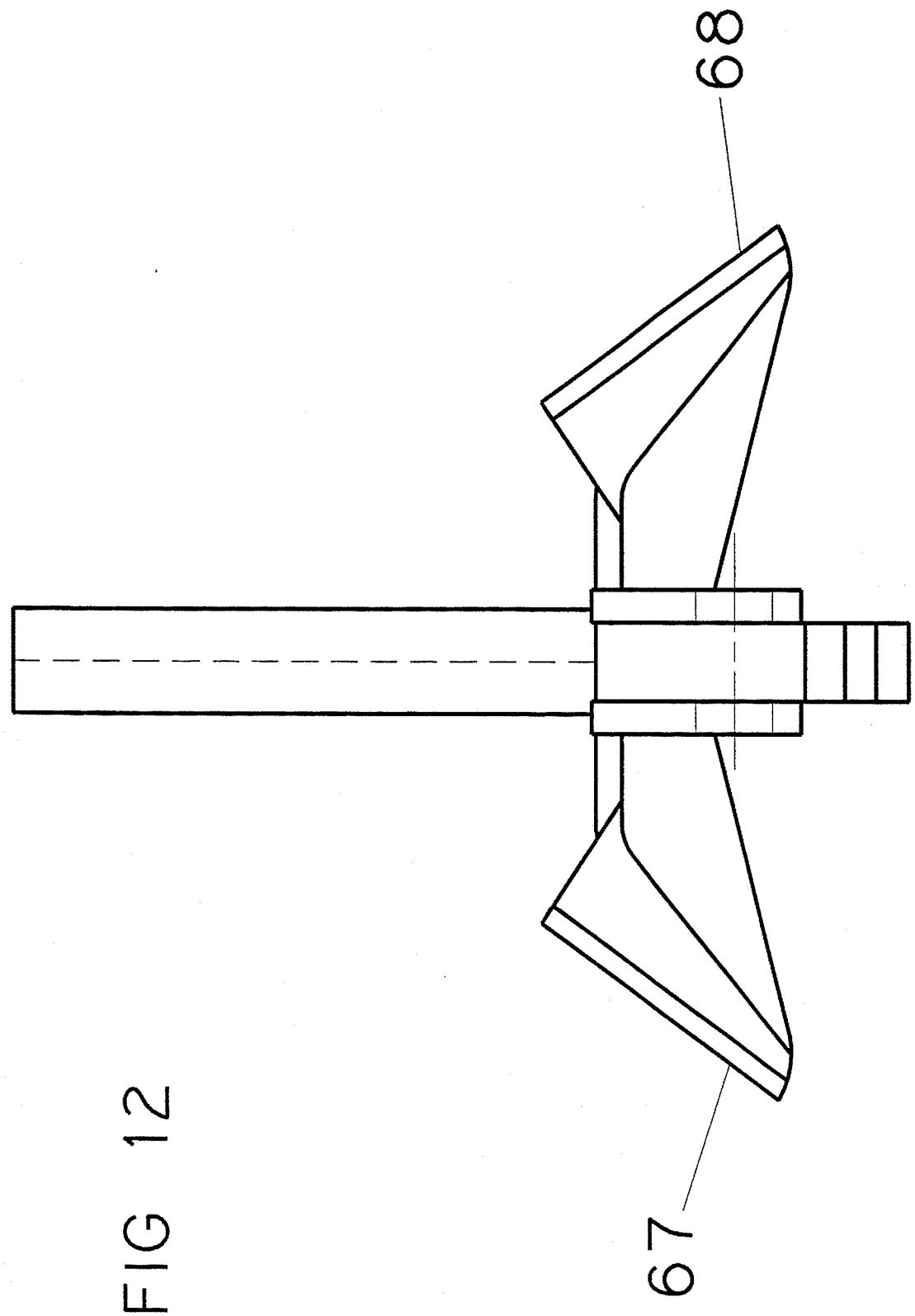
FIG. 12 is a rear view of the working unit of FIG. 10.

Turning now to the embodiment shown in FIGS. 10–12, it is similar to the embodiment shown in FIGS. 3 and 4 in structure except as indicated presently. However, this embodiment is designed to add additional lateral lift to the soil, as might be desired in wet soil conditions. Toward this end, at the rear end of each of the lift surfaces 78, 78a, there are trailing wing tips generally designated 98 and 99, respectively. Each wing tip has a triangular transition section designated 98a and 99a, respectively, and corresponding trailing sections designated 98b and 99b, respectively. Referring now to FIG. 10, the transition section 98a is bent upwardly and away from the plane of the working surface 78 of the left wing section; and the trailing section 98b of the wing tip is bent up and away at an even greater inclination, thereby enhancing the effect of fracturing soil laterally and imparting more energy to overcome the plasticity of wet soil.

Having thus disclosed in detail a number of embodiments of the invention, persons skilled in the art will be able to modify certain of the structure which has been disclosed and to substitute equivalent elements for those described while continuing to practice the principle of the invention; and it is, therefore, intended that all such modifications and substitutions be covered as they are embraced within the spirit and scope of the appended claims.

I claim:

1. A primary tillage implement adapted to be drawn by a tractor, comprising:
a frame;
a plurality of tillage units mounted in laterally spaced relation on said frame, each tillage unit comprising, in combination:
a coulter mounted to said frame for forming a slot in the soil; and
a chisel plow mounted to said frame behind said coulter and including
a narrow shank mounted in fore-to-aft alignment with said coulter;
a soil-working unit mounted to the bottom of said shank for working at a depth of at least six inches below the surface, said unit including
a point extending forwardly of said shank, said point having an upper, soil-engaging surface extending upwardly and rearwardly of the forwardmost leading portion thereof for fracturing soil in a first zone between said point and the slot formed by said coulter without substantially displacing the fractured soil; and
a pair of swept wings cooperating to form a delta wing when viewed from above, said wings extending laterally and rearwardly of the inclined upper rear portion of said soil-engaging portion of said point and including soil lift surfaces adapted to lift the soil adjacent said point and to loosen said soil without throwing surface soil to the side, each lift surface having a lift angle in the fore-to-aft direction less than about 13° and a total vertical soil displacement of less than about two inches, whereby said soil is loosened while leaving surface soil and residue substantially undisturbed.

2. The apparatus of claim 1 wherein said tillage unit further comprises first and second side plates mounted at their forward portions respectively to the left and right sides of said point and extending rearwardly thereof to define an opening for receiving the bottom portion of said shank, each of said side plates and said shank defining an aperture, said apertures receiving a bolt for securing said working unit to said shank.

3. The apparatus of claim 2 wherein said shank defines a notch providing an upwardly and rearwardly inclined bearing surface at the front thereof, and wherein a rear portion of said point defines a projection with a bearing surface engaging the bearing surface of said notch in said shank.

4. The apparatus of claim 1 wherein said point has a width only slightly larger than the width of said shank and said point is elongated in the fore-to-aft direction and includes a mid-section rearward of said soil engaging leading portion, said mid-section being located in front of said shank, said apparatus further comprising a fin extending upwardly of the mid-section of said point and having a leading edge and first and second tapered side sections extending rearwardly and outwardly of said leading edge to define a rear surface adjacent the forward surface of said shank.

5. The apparatus of claim 4 characterized in that said rear surface has a width slightly greater than the width of said shank and said fin extends from said point upwardly to a location communicating with the slot formed by said coulter, whereby said fin parts soil in said first fracture zone and displaces it laterally beyond the sides of said shank.

6. The apparatus of claim 5 further comprising a brace welded to the lower surface of said point and extending rearwardly thereof and engaging the bottom of said shank when said working unit is assembled to said shank.

7. The apparatus of claim 1 wherein each of said wing sections includes a rigid support welded to an associated side plate and extending horizontally laterally thereof, and further secured to said point to form a rigid brace and support, each of said supports further extending downwardly and forwardly to define the angle of an associated work surface of an associated wing; a removable wing share of hardened metal adjacent the inclined surface of an associated support for defining the working surface of an associated wing; and threaded fastener means for securing said wing shares to said first and second side supports respectively, whereby said wing shares may be removed and replaced when worn or damaged.

8. The apparatus of claim 1 further comprising tail sections associated with each of said wing sections and located at the downstream end thereof, each tail section including a transition section extending upwardly and rearwardly at a first angle from the associated wing section, and a rear section extending upwardly and rearwardly of an associated transition section and at a second angle greater than the first angle of said transition section to impart additional lateral and upward displacement force to soil.

9. An agricultural tillage implement adapted to be drawn by a tractor, comprising a frame, a plurality of tillage units mounted in laterally spaced relation on said frame, each tillage unit comprising, in combination, a coulter mounted to said frame for cutting the soil; and a chisel plow mounted to said frame behind said coulter and including a shank having a width less than approximately one inch mounted in alignment with said coulter, a ground working unit mounted to the bottom of said shank and extending forwardly of said shank, said ground working unit including a point having a soil-engaging surface extending upwardly and rearwardly of the forwardmost leading portion thereof for fracturing soil in a first zone above and laterally of said point without substantially displacing the fractured soil; and a pair of rearwardly swept wings mounted to said point extending laterally and rearwardly of the inclined upper rear portion of said point and including soil lift surfaces adapted to lift the soil adjacent the upper portion of said soil engaging surface of said point and to loosen said soil without throwing the soil to the side, each wing lift surface defining a leading edge defining an included angle relative to a plane extending normal to the direction of travel greater than 60°, said wing sections characterized in that the innermost sections thereof adjacent the sides of said shank effect substantially all of the lift of said soil in regions adjacent the sides of said shank, and in locations forward of said shank, whereby said shank traverses soil which is broken before the shank passes and soil is loosened while leaving the surface profile substantially undisturbed, thereby reducing the disturbance of surface residue.

10. An agricultural implement adapted to be drawn by a tractor at ground speeds in the range of 4 to 7 miles per hour and adapted to till soil at a depth greater than approximately six inches, comprising a frame; and a plurality of tillage units mounted in laterally spaced relation on said frame, each tillage unit comprising, in combination: a coulter mounted to said frame for cutting the soil; and a chisel plow mounted to said frame behind said coulter and including a shank having a width less than approximately one inch mounted in alignment with an associated coulter; a ground working unit mounted to the bottom of said shank and extending forwardly of said shank,, said ground working unit including a point having a soil-engaging surface extending upwardly and rearwardly of the forwardmost leading portion thereof for fracturing soil in a forward zone above and laterally of said point without substantially displacing the fractured soil; and a pair of rearwardly swept wings mounted to said point extending laterally and rearwardly of, and above said soil-engaging surface of said point, each wing including a soil lift surface adapted to engage and lift the soil adjacent said point and to fracture and loosen said soil in a second zone extending laterally and continuously between adjacent tillage units, without throwing the soil to the side, each lift surface defining a generally horizontal leading edge defining an included angle relative to a vertical plane extending normal to the direction of travel in a range of approximately 60°–75°, said wing sections characterized in that the overall width, tip-to-tip of said wings, is less than about twelve inches, the innermost sections thereof adjacent the sides of said shank effecting substantially all of the lift of said soil in regions immediately adjacent the sides of said shank, said lift occurring forwardly of said shank, said soil lift surfaces being arranged to lift the soil less than about two inches, whereby said shank traverses soil which is broken before the shank passes and sub-surface soil is loosened while leaving the surface profile substantially undisturbed, thereby reducing the disturbance of surface residue.

11. A primary tillage implement adapted to be drawn by a tractor at ground speed in excess of 4 miles per hour, comprising a frame; and a plurality of tillage units mounted in laterally spaced relation on said frame, each tillage unit comprising, in combination: a coulter mounted to said frame for cutting the soil; and a chisel plow mounted to said frame behind said coulter and including a shank having a width less than approximately one inch mounted in alignment with an associated coulter, a ground working unit mounted to the bottom of said shank for working at a depth of at least six inches below the surface of said soil and extending forwardly of said shank, said ground working unit including a point having a soil-engaging surface extending upwardly and rearwardly of the forwardmost leading portion thereof for fracturing soil in a zone above and laterally of said point without substantially displacing the fractured soil; and a pair of rearwardly swept wings mounted to said point extending laterally and rearwardly of the inclined upper rear portion of said point, each wing including a soil lift surface adapted to engage and lift the soil adjacent said shank and to loosen said soil without throwing the soil to the side, each lift surface defining a generally horizontal leading edge and having a total lift in the range of approximately 1–2 in., each leading edge defining an included angle relative to a plane extending normal to the direction of travel and as viewed from above in the range of approximately 60°–75°, said soil lift surfaces characterized in having an overall width less than about twelve inches and defining a lift angle in a vertical plane parallel to the direction of travel in the range of approximately 8°–13°, whereby said shank traverses soil which is lifted and broken by said point before the shank passes, and sub-surface soil is loosened and broken while leaving the surface profile substantially undisturbed, thereby reducing the disturbance of surface residue.

12. A primary tillage implement adapted to be drawn by a tractor at ground speed in excess of 4 miles per hour, comprising a frame; and a plurality of tillage units mounted in laterally spaced relation on said frame, each tillage unit comprising, in combination: a coulter mounted to said frame for cutting the soil; and a chisel plow mounted to said frame behind said coulter and including a shank having a width less than approximately one inch mounted in alignment with an associated coulter, a ground working unit mounted to the bottom of said shank for working at a depth of at least six inches below the surface of said soil and extending forwardly of said shank, said ground working unit including a point having a soil-engaging surface extending upwardly and rearwardly of the forwardmost leading portion thereof for fracturing soil in a forward zone above and laterally of said point and up to the slot formed by said coulter without substantially displacing the fractured soil; means forming a leading edge above said point and in front of said shank for moving soil between said point and said coulter slot laterally of said shank; and a pair of rearwardly swept wings mounted to said point extending laterally and rearwardly of the inclined upper rear portion of said point, each wing including a soil lift surface adapted to engage and lift the soil adjacent said point and to loosen said soil without throwing the soil to the side, each lift surface defining a leading edge located above said soil-engaging surface of said point, said lift surfaces of said wings having an effective soil lift height of approximately 1½ in., each effective leading edge defining an included angle relative to a plane extending normal to the direction of travel and as viewed from above in the range of approximately 60°–75°, said soil lift surfaces characterized in having an overall width less than about twelve inches and defining a lift angle in a vertical plane parallel to the direction of travel in the range of approximately 8°–13°, whereby said shank traverses soil which is lifted and broken by said point before the shank passes, and sub-surface soil is loosened and broken while leaving the surface profile substantially undisturbed, thereby reducing the disturbance of surface residue.

* * * * *